June 29, 1954
C. M. HATHAWAY
2,682,170
NOISE SUPPRESSOR FOR STRAIN GAUGES
Filed July 29, 1950
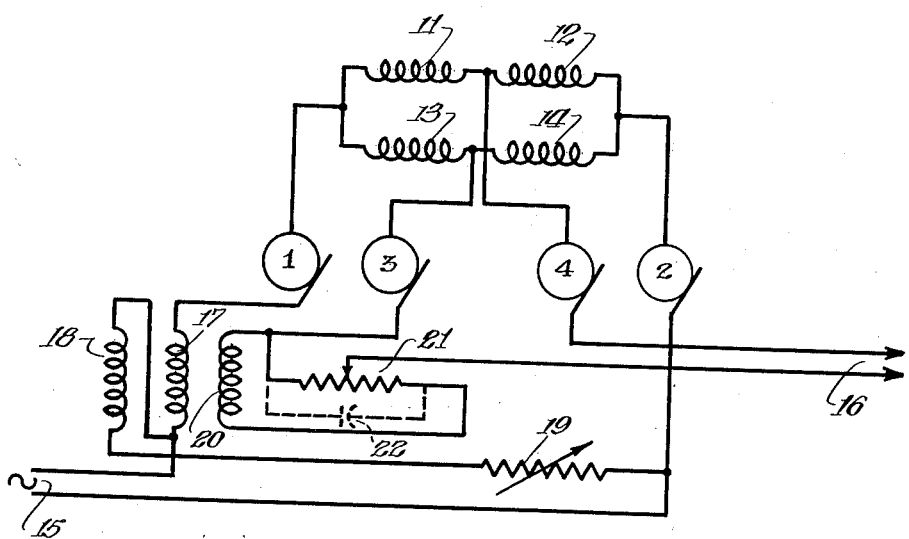
Inventor:
Claude M. Hathaway
By: Alois W. Graf
Attorney Patented June 29, 1954

2,682,170

UNITED STATES PATENT OFFICE 2,682,170

NOISE SUPPRESSOR FOR STRAIN GAUGES

Claude M. Hathaway, Denver, Colo., assignor to Hathaway Instrument Company, Denver, Colo., a corporation of Colorado Application July 29, 1950, Serial No. 176,579

8 Claims. (Cl. 73—88.5)

The present invention relates to an apparatus and circuit for reducing the noise heretofore encountered in the use of strain gauges mounted on rotating members.

Frequently it is necessary to mount resistance or inductance strain gauges on a rotating member and to make electrical connections thereto. It has been found to be the best practice to mount an entire bridge network of gauges on the rotating member and to use a plurality of slip rings for connections to the bridge network. Normally two slip rings are used to supply alternating current excitation voltage to the bridge and two other slip rings are used to bring out the unbalanced voltage, which then may be utilized by any suitable circuit.

In such an arrangement, however, any changes in the slip ring brush contact resistance do not produce an unbalance of the bridge and, hence, with a zero strain or zero bridge output, no output voltage is produced by changes in the contact resistance of the slip rings. If, however, there is an unbalanced voltage generated because of strain being present, changes in contact resistance of the slip rings supplying the alternating current source will produce changes in output voltage. To minimize this detrimental effect it has been proposed to utilize gauges of high impedance so that the contact resistance change should be comparatively small with respect to the impedance of the bridge network. However, even with the use of high impedance gauges and networks, variations in slip ring contact resistance introduce troublesome noises or undesired components in the output voltage.

It, therefore, would be desirable to provide a circuit or means which will minimize the effects of changes in slip ring contact resistance.

It is, therefore, an object of the present invention to provide an improved circuit and method for minimizing the detrimental effects heretofore encountered in slip ring brush contact resistance where strain gauges are mounted on rotating members.

A still further object of the present invention is to provide an arrangement whereby contact noise generated by slip rings may be minimized and whereby a correction factor may be introduced having the same phase angle as that of the bridge network.

Other and further objects of the present invention subsequently will become apparent by reference to the following description taken in conjunction with the accompanying drawing wherein the circuit diagram illustrates the principles of the present invention.

In the drawing there is disclosed a strain gauge network, which might be composed of wire strain gauges or inductance gauges. Four inductance gauges 11, 12, 13 and 14 have been represented as connected in a bridge network and mounted on a rotating member. Two of the gauges are arranged to be non-responsive to changes in stress or strain of the rotating member so that a change in the impedance of the strain responsive elements will produce an unbalanced voltage at the output terminals of the bridge network, which are connected to slip rings 3 and 4. Two input terminals to the bridge network are provided which are connected to slip rings 1 and 2. A suitable source of alternating current voltage 15 is provided having the desired frequency, which might be several thousand cycles per second. One terminal leading from the source of alternating current voltage 15 is connected through a transformer winding 17 to the commutator brush of the slip ring 1. The transformer is provided with another winding 18 having one terminal connected to the source of current 15. The other terminal of the transformer winding 18 is connected through an adjustable resistor or impedance 19 to the commutator brush of the slip ring 2, which is also connected to the other terminal of the alternating current source 15. The transformer has still another winding 20 having one terminal connected to the commutator brush of the slip ring 3. Connected across the transformer winding 20 is a voltage divider resistor 21 having its movable contact connected to one conductor of the output terminals 16. The other output terminal 16 is connected to the commutator brush of the slip ring 4. Where it is desired to provide means for making adjustments so as to obtain the same phase angle for the compensating effects as that of the bridge network, a variable capacitor 22 is connected in parallel with the voltage divider 21.

The transformer winding 17 is connected in series with the alternating current source 15 so as to produce a magnetic flux in the transformer core, which is proportional to the alternating current flowing through the transformer. The other winding 18 is connected in series with a variable impedance 19 across the alternating current source in such manner that the fluxes produced by the windings 17 and 18 oppose each other. By adjusting the variable impedance 19, the flux produced in the core of the transformer can be adjusted to zero.

If now it is assumed there is a change in the contact resistance of the brushes with the slip rings, the current flowing through the winding 17 of the transformer will change and a voltage will be introduced in the secondary winding 20. The secondary winding 20 is connected to a voltage divider 21 so that a desired portion of this voltage is introduced in series with the output voltage in order to balance out the voltage change, which would be produced in the output due to slip ring contact resistance.

If now it is assumed that none of the slip rings are turning, slip rings 3 and 4 may be connected together and the resistor 19 is adjusted so that no voltage is induced in the secondary winding 20. The connection between the slip rings 3 and 4 is then removed and the slip rings are rotated. Thereupon the contact on the voltage divider 21 is adjusted for minimum contact noise. Since the voltage introduced into the output circuit must have the same phase angle as that obtained from the output terminals of the bridge network, the effective impedance may comprise the resistor 21 and a variable capacitor 22. Where the use of a capacitor 22 has been found necessary, the capacitor 22 must be adjusted independently to obtain the proper balance.

While for the purpose of illustrating and describing the present invention a certain desired circuit arrangement has been shown in the drawing, it is to be understood that the invention is not to be limited thereby, since such variations in the circuit and in the components employed therein are contemplated as may be commensurate with the spirit and scope of the invention set forth in the accompanying claims.

I claim as my invention:

1. A noise reducing arrangement for a strain responsive bridge network mounted on a rotating member having input and output slip rings, said network having an input and an output connected to said input and output rings, respectively, comprising a source of alternating current connected to said input rings, a transformer having one winding connected between said source of current and one of said input rings, means for neutralizing the flux produced in said transformer by current normally flowing through said winding, and means connected in series with one of the output rings for deriving from said transformer when current flowing therethrough changes a potential to be introduced in series with the output of said network.

2. A noise reducing arrangement for a strain responsive bridge network mounted on a rotating member having input and output slip rings, said network having an input and an output connected to said input and output rings respectively comprising a source of alternating current connected to the input rings of said network, a transformer having one winding connected in series with one connection from said source to one of the input rings to said network, said transformer having means for neutralizing the flux produced therein by current normally flowing through said winding, and means connected in series with one of the output rings for deriving from said transformer when current flowing therethrough changes a potential to be introduced in series with the output of said network to neutralize noise effects produced by variations of contact resistance at said slip rings.

3. A disturbance reducing arrangement for a strain responsive bridge network mounted on a rotating member having an input and an output, a plurality of input and output slip rings, connections between said input and output and said input and output slip rings respectively, a source of alternating current connected to the input rings of said network, a transformer having one winding connected in series with one of the input rings to said network, said transformer having another winding arranged for neutralizing the flux produced in said transformer by current normally flowing through said first winding, and means connected in series with one of the output rings for deriving from said transformer when current flowing therethrough changes a potential to be introduced in series with the output of said network to neutralize disturbances produced by variations of contact resistance at said slip rings.

4. The combination for eliminating the effects of contact resistance variations on input and output slip rings for a strain responsive bridge network mounted on a rotating member, said network having an input and an output, comprising connections between the input and the output of said network to said input and output slip rings respectively, a source of alternating current connected through said input slip rings to said network, means connected between said source and said network for producing potentials in accordance with variations of contact resistance of said slip rings, and means connected in series with one of the output rings for introducing into the output of said bridge network components of said potentials of such phase and magnitude as to neutralize the effects of contact resistance variations.

5. The combination for eliminating the effects of contact resistance variations on input and output slip rings for a strain responsive bridge network mounted on a rotating member and having an input and an output connected to said input and output slip rings respectively comprising a source of alternating current connected to the input rings to said network, transformer means connected in series with said source and one of said input rings for producing potentials in accordance with variations of contact resistance of said slip rings, and means connected to said transformer for introducing in series with one of the output rings of said bridge network components of said potentials of such phase and magnitude as to neutralize the effects of contact resistance variations.

6. The combination for a strain responsive bridge network mounted on a rotating member provided with input and output slip rings, an input and an output for said network, comprising connections between the input and the output of said network to said input and output slip rings, respectively, a source of alternating current, a transformer having primary, secondary and tertiary windings, said primary winding being connected in series between said alternating current source and one of said input rings, a variable impedance, said impedance and said tertiary winding being connected in series across said source of alternating current, said secondary winding being connected in series with the output rings of said bridge network.

7. The combination for a strain responsive bridge network mounted on a rotating member having input and output slip rings connected to the input and the output of said network respectively comprising a source of alternating current, a transformer having primary, secondary and tertiary windings, said primary winding being connected in series between said alternating current source and one of said input rings, a variable impedance connected in series with said tertiary winding and said source of alternating current, a phase shifting network, said secondary winding being connected in series with said phase shifting network and one of the output rings of said bridge network.

8. The combination for a strain responsive bridge network mounted on a rotating member provided with input and output slip rings, said network having an input and an output connected to said input and output slip rings respectively, comprising a source of alternating current, a transformer having primary, secondary and tertiary windings, said primary winding being connected in series between said alternating current source and one of the input rings to said network, a variable impedance connected in series with said tertiary winding, said impedance and said tertiary winding being connected in series across said source of alternating current, a second variable impedance connected to said secondary winding, a pair of output terminals connected to said output rings, said secondary winding and said impedance being connected in series between one of said output rings and one of said output terminals.

References Cited in the file of this patent

UNITED STATES PATENTS

| Number | Name | Date |
| --- | --- | --- |
| 2,392,293 | Ruge | Jan. 1, 1946 |
| 2,423,620 | Ruge | July 8, 1947 |
| 2,447,566 | Decker | Aug. 24, 1948 |
| 2,447,734 | Capuzzi | Aug. 24, 1948 |
| 2,457,165 | McNamee | Dec. 28, 1948 |